Feb. 23, 1954    H. N. STONE    2,670,426
GAS HEATER
Filed May 1, 1952
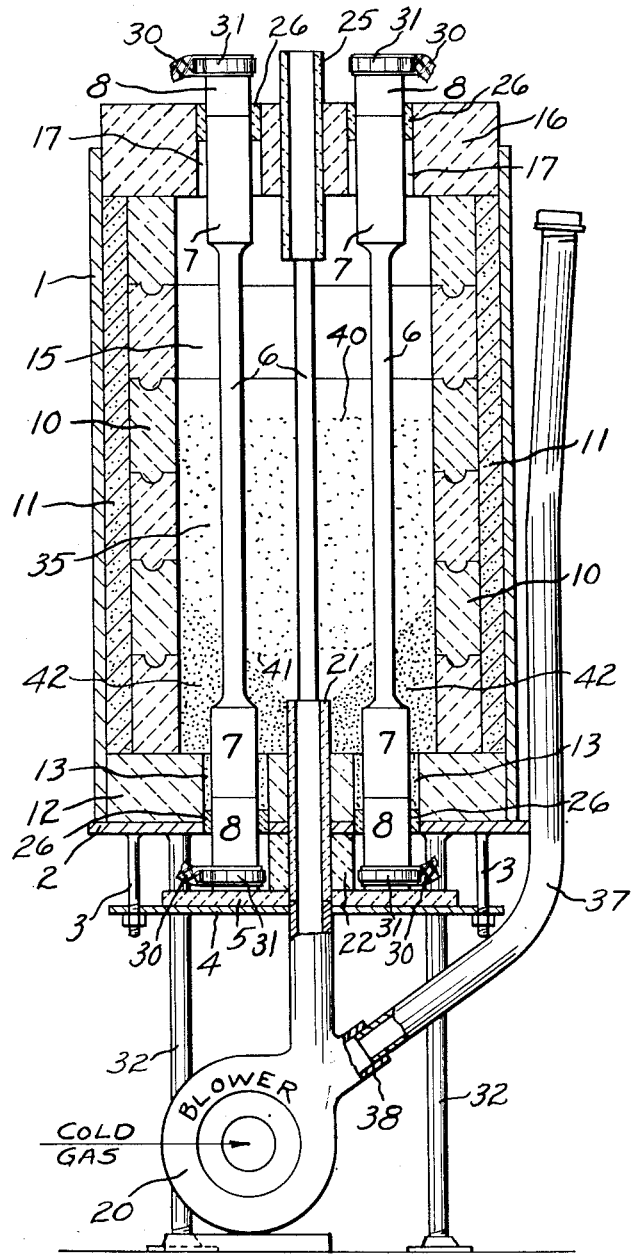
INVENTOR.
H. NATHAN STONE
BY
ATTORNEY Patented Feb. 23, 1954

2,670,426

UNITED STATES PATENT OFFICE 2,670,426

GAS HEATER

H. Nathan Stone, Worcester, Mass., assignor to Norton Company, Worcester, Mass., a corporation of Massachusetts Application May 1, 1952, Serial No. 285,579

9 Claims. (Cl. 219—39)

The invention relates to gas heaters.

One object of the invention is to provide gas heating apparatus which can be embodied in a small compact unit. Another object of the invention is to provide apparatus for rapidly heating gas by means of electric resistance heating units. Another object of the invention is to extract larger quantities of heat units per unit volume of heater equipment, thus attaining high output of thermal energy from such resistors. Another object is to achieve a high heat transfer coefficient from a resistance unit to gas. Another object of the invention is to provide an extremely simple electrical heater for heating gases to high temperatures.

Other objects will be in part obvious or in part pointed out hereinafter.

The accompanying drawing illustrates an embodiment of the invention in which most of the heater is shown in vertical section, the remainder in elevation.

In the illustrative embodiment of the invention shown in the drawing, a cylindrical casing 1 made for example out of steel plate is welded to a bottom plate 2 also made out of steel plate and the bottom plate 2 has bolts 3 depending therefrom which support a steel plate 4 which supports a refractory plate 5 which supports a plurality of resistors 6 having enlarged end portions 7 and cold ends 8. The resistor rods 6 are made of recrystallized silicon carbide according to a general process invented by Francis A. J. Fitzgerald, see for example U. S. Patent No. 650,234, dated May 22, 1900. This process was developed in Switzerland for the manufacture of resistors about thirty years ago and such resistors are now well known. The cold ends 8 are made by impregnation with silicon as described in U. S. patent to Henry Noel Potter, No. 1,030,327 of June 25, 1912. The silicon impregnated silicon carbide has far lower resistivity than the remainder of the resistor which is simply recrystalized silicon carbide. Furthermore by providing enlarged ends 7 the resistance per unit length is lower adjacent the cold ends 8 than it is in the middle portions of the resistors and therefore they can be operated at higher than usual temperatures without destroying the cold ends 8 which are not very refractory because silicon melts at about 1420° C.

The steel bottom 2 supports a cylindrical lining 10 which can be built up out of individual bricks as illustrated, each brick being curved as viewed from the top. For many practical applications I prefer to use sintered alumina bricks but in other cases bonded silicon carbide bricks can be used. The space between the cylindrical casing 1 and the cylindrical lining 10 should be filled with some refractory thermal insulation such as zirconia grain 11. The cylindrical lining 10 is supported on a refractory plate 12 having oversized openings 13 through which extend the portions 7 and 8 of the resistors 6. Closing the top of the chamber 15 formed by the structure described is a refractory cap 16 having oversized holes 17 for the upper portions 7 and 8 of the resistors 6. The bottom plate 12 and the cap 16 are preferably made of the same material as the cylindrical lining 10.

I provide a blower 20 which is more or less diagrammatically illustrated and the intake side of the blower 20 is connected to a source of gas which is to be heated. The output end of this blower is connected to a refractory tube 21 which extends through the plate 5, through a refractory sleeve 22 supported by the plate 5, through the bottom plate 2 and through the refractory bottom plate 12 to the chamber 15. A refractory tube 25 extends through the cap 16 to remove the heated gas from the chamber 15 whence it goes to any apparatus for any process with which this invention is not concerned. The oversized holes 13 and 17 in the refractory bottom plate 12 and refractory caps 16 are plugged by asbestos packing 26 to prevent the escape of gas. Braided metal ribbon conductors 30 are secured on the cold ends 8 by means of spring metal clips 31. The apparatus can have any desired base or support; illustratively it is shown supported by legs 32.

The chamber 15 contains a quantity of fine particles 35 of refractory material in "fluidized" condition. The refractory material may be an oxide, carbide, silicide, nitride, boride or a mixture of compounds. Just what refractory to select depends upon which are poisonous to whatever reaction is to take place and it also depends upon availability and cost. Furthermore the nature of the gas being heated in the chamber 15 has to be considered. If this is reducing it might be desirable to avoid some of the oxides if the temperature is too high; if the gas is oxidizing it might be desirable to avoid some of the carbides. Readily available refractory oxides are alumina, silica and magnesia; the most readily available and inexpensive carbide which is sufficiently refractory for most applications is silicon carbide which will probably be preferred in most instances. The borides, silicides and nitrides are less available and more expensive but some thereof may be preferred for particular applications.

The particle size of the refractory material is a matter for careful consideration. In general the finer the particle size of the "fluidized" material the more efficient is the transfer of heat from the resistors 6 to the gas to be heated and therefore, for a given temperature of the gas exhausting from the refractory pipe 25, the higher can be the rate of flow of the gas being heated. However for several reasons it is undesirable to lose particles in great quantities, it is expensive, it requires cleaning of any apparatus coupled to the heater, and it may interfere with some reactions. Accordingly since particles of the finer sizes will be carried away through the pipe 25 and lost to the heater, I find it is in general desirable to use particles not finer than 100 grit size. On the other hand for efficient use of the heater the particles in general should be no coarser than 60 grit size. So therefore the best specification is that the particles be through No. 60 screen onto No. 100 screen. However this is no hard and fast rule because for some applications loss of particles would be unimportant but rate of heat transfer might be very important hence there is no real limit to the fineness of the particles which can be employed although for practical purposes I can say that particles finer than 600 grit size, U. S. Bureau of Standards, probably would not be used. At the other end of the scale particles coarser than 24 grit size would not appear to be useful in this invntion.

The fluidized particles 35 in the chamber 15 are heated by the resistor rods 6. The illustrative embodiment is of four rods 6, two having axes in the plane of the section, the middle one being near the far side of the chamber 15, and there being a fourth one, not shown, in front of the plane of the section; thus the rods 6 are symmetrically located in the chamber 15. One or more resistor rods 6 deliver more heat units per minute to the fluidized particles than they would to the walls of the chamber 15 and thus the introduction of the bed of fluidized solids makes it possible to extract much more heat from the resistor rods in a heater of a given size than could be extracted in the absence of the fluidized particles. This can best be illustrated by these examples:

*Example I*

A vertical tube has several vertical resistor rods distributed within it and a non-radiating gas is passed upward through the tube in order to pick up heat from the resistor rods. The heat transfer mechanisms are convection and conduction and the areas of transfer simply the surface areas of the rods and the tube which absorbs radiant energy from the rods and passes it on to the gas by convection and conduction. The heat transfer coefficient is controlled by the gas velocity and because of practical limitations the velocity is confined to a region which provides extremely low heat transfer coefficients. This is primarily due to the existence of slow moving gas films along the heating surface wherein the heat transfer is purely by conduction and gases have low heat conductivities.

*Example II*

This case is the same as Example I except that a static bed of granular solids is introduced into the tube. The mechanism of transfer is somewhat changed. Those solids in contact with the heating surface pick up heat by solid to solid conduction and those solids in view of the rods absorb radiant energy. However, since the bed is static a temperature gradient is set up such that those particles close to the rods are extremely hot and those at some distance very cool. The main reason for this extreme gradient is the fact that for this temperature region refractory solids with low heat conductivities must be used. True the gas to solid contact area has been greatly increased but a large portion of the solid surfaces will be at far too low a temperature.

*Example III*

This case is the same as Example II except that the gas velocity is increased to the point where fluidization is obtained. The mechanism of heat transfer is the same as in Example II but now the mechanical turbulence brings about a uniform temperature throughout the bed. The heat transfer area is greatly increased and though the overall gas velocity may be low, the localized gas velocity between the particles is high, and so the slow moving gas films are reduced to a minimum. This results in an overall heat transfer coefficient many times larger than that available in either Example I or II.

Regardless of how carefully the grit was screened to eliminate fines some fines will necessarily be found among the particles 35 when the apparatus is first charged therewith. Most of these will soon pass out through the pipe 25. Thus after the apparatus has been in use for a short time there is very little loss of fluidized particles but occasionally a particle will gain the velocity of each and be lost. Therefore if calculation is made for the initial loss the heater will operate for a long time without replenishment of particles but eventually replenishment has to be made. I provide a long pipe 37 welded to the bottom plate 2 and secured to a branch 38 of the blower 20, this pipe 37 having an opening with a removable cap above the surface 40 of the fluidized particles 35, and at any time particles can be added to the system through the pipe 37 without stopping the blower 20. It will be noted that replenishment of particles will not cause any to impinge upon the blades of the blower because they are replenished at the exhaust side of the blower.

The "fluidized" condition is really a state of gaseous emulsion. The gas entering the chamber 15 from the tube 21 sustains the particles 35 in the chamber and the fluidized particles have two levels; the upper surface 40 which is like the surface of a body of water, and the lower surface 41 which may be likened to the bottom of a cloud. Below the surface 41 the velocity of the gas stream is too great for the particles to remain. However it must be understood that neither the surface 40 nor the surface 41 is a well defined surface because turbulence makes it irregular.

Although I could provide the chamber 15 with a funnel shaped bottom, this is constructionally more difficult and instead I merely allow a large quantity of refractory particles to form a stagnant mass 42 of particles because this stagnant mass will assume a funnel shape as illustrated. Again the boundary between the stagnant mass 42 and the fluidized particles 35 is not a fixed and even boundary; on the contrary individual particles move out of the one zone into the other zone and back again. In case the fluidized particles 35 and the stagnant mass 42 are made up of silicon carbide particles there is formed a thermal gradient from the fluidized particles to the bottom of the plate 12 because silicon carbide is a fairly good conductor of heat and this feature is advantageous for the protection of the resistors as it subjects them to less thermal shock. The same result is achieved to a lesser extent when alumina particles are used. This feature cannot be provided at the top of the apparatus but the cold end junctions are nearer the upper ends of the resistors than they are to the lower ends of the resistors and furthermore the gas is exhausted from the chamber 15 below the enlarged end portions and these features together with the oversized holes 17 serve to a considerable extent to provide the desired thermal gradient. In other words the resistors can be non-symmetrical lengthwise to permit them to be operated at high temperatures without danger to the cold ends 8.

The selection of material is important but depends upon the gas being heated and the temperatures of the resistors 6. Sintered alumina is a good material from which to make the refractory tubes, the cylindrical lining, the refractory plate and the refractory cap. This material is highly resistant to abrasion. When used in combination with alumina particles to be fluidized there can be no reaction between such particles and the wall, top and bottom of the chamber. There are processes where a slight contamination of the gas with alumina would not be objectionable but where a slight contamination with a carbide such as silicon carbide would be objectionable. In such cases the chamber walls, top and bottom as well as the fluidized particles, may be all of alumina. But at the higher temperatures at which the resistors 6 can be operated, that is to say at temperatures above 1450° C., the fluidized particles 35 (and of course also the stagnant particles 42) should be silicon carbide particles to avoid any reaction with the resistors 6 and in that case the lining 10, bottom plate 12 and cap 16 ought also to be made out of silicon carbide but they will naturally be made out of bonded silicon carbide (recrystallized silicon carbide is porous) in accordance with formulae well known in the refractory brick division of the ceramic arts. Bonded silicon carbide bricks can stand temperatures of 1500° C. and sometimes above and they are not electrically conductive whereas the recrystallized silicon carbide is electrically conductive. Bonded silicon carbide otherwise known as vitrified silicon carbide is thermally conductive but the mass of zirconic grain 11 is a good thermal insulator and hence little heat will escape from the apparatus except at the top and bottom when silicon carbide is used and as already explained a gradual heat gradient is desirable and the slight heat loss can be tolerated. Therefore in many cases the all silicon carbide combination will be preferred.

There are many gases such as the inert gases argon, helium, krypton, and xenon which can be heated to high temperatures without deterioration of the resistors 6 and others, such as nitrogen, affect silicon carbide resistors only slowly, ammonia will affect the silicon carbide resistors 6 only slightly at temperatures below 1450° C. and many other gases can be heated in my apparatus at various temperatures depending upon how important long life for the resistors may be under particular circumstances. Any explanation of why gases have to be heated in industry or in scientific research would seem to be beyond the scope of this specification which deals with the heater so it should suffice to say that there are many reasons for heating gases to high temperatures. In accordance with the present invention a small compact heater is provided which will rapidly heat certain gases to high temperatures with little loss of energy.

Resistors of material other than silicon carbide can be used in this invention. For example, resistances of metal, either coils or straight bars, can be used. Molybdenum is a highly refractory metal used to make heating resistances and while it oxidizes readily in air it can be heated to close to its melting point (2620° C.) in the inert gases and to above 1400° C. in nitrogen or in ammonia. However there are many other metals and alloys which can be used for the resistance elements and also resistor bars have been made of certain oxides. For certain applications graphite resistors might be preferred.

It will thus be seen that there has been provided by this invention a heater in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A gas heating apparatus comprising a refractory lined fluidizing chamber, electrical resistance heating means in said chamber, said chamber having an upper opening and said chamber having an opening in the bottom thereof, and a quantity of silicon carbide particles in said fluidizing chamber, said particles being between 24 grit size and 600 grit size, whereby when gas is forced through said chamber from the opening in the bottom thereof to the upper opening at sufficient velocity some of the particles will be fluidized and heat transfer from the electrical resistance heating means to the gas will be accelerated.

2. A gas heating apparatus as claimed in claim 1 in which the electrical resistance heating means comprises silicon carbide resistors.

3. A gas heating apparatus as claimed in claim 2 in which the refractory lining of the chamber is a silicon carbide lining.

4. A gas heating apparatus as claimed in claim 1 in which the refractory lining of the chamber is a silicon carbide lining.

5. A gas heating apparatus comprising an alumina refractory lined fluidizing chamber, electrical resistance heating means in said chamber, said chamber having an upper opening and said chamber having an opening in the bottom thereof, and a quantity of alumina particles in said fluidizing chamber, said particles being between 24 grit size and 600 grit size, whereby when gas is forced through said chamber from the opening in the bottom thereof to the upper opening at sufficient velocity some of the particles will be fluidized and heat transfer from the electrical heating resistance means to the gas will be accelerated.

6. A gas heating apparatus comprising a refractory lined fluidizing chamber, silicon carbide resistors in said chamber, said chamber having an upper opening and said chamber having an opening in the bottom thereof, and a quantity of alumina particles in said fluidizing chamber, said particles being between 24 grit size and 600 grit size, whereby when gas is forced through said chamber from the opening in the bottom thereof to the upper opening at sufficient velocity some of the particles will be fluidized and heat transfer from the silicon carbide resistors to the gas will be accelerated.

7. A gas heating apparatus comprising a refractory lined fluidizing chamber, elongated electrical resistors extending vertically through said chamber, said chamber having an upper opening and said chamber having an opening in the bottom thereof, and a quantity of refractory particles in said fluidizing chamber, said particles being between 24 grit size and 600 grit size, whereby when gas is forced through said chamber from the opening in the bottom thereof to the upper opening at sufficient velocity some of the particles will be fluidized and heat transfer from the electrical resistors to the gas will be accelerated.

8. A gas heating apparatus as claimed in claim 7 in which the refractory particles are silicon carbide particles.

9. A gas heating apparatus as claimed in claim 8 in which the electrical resistors are silicon carbide resistors.

H. NATHAN STONE.

References Cited in the file of this patent

UNITED STATES PATENTS

| Number | Name | Date |
| --- | --- | --- |
| 1,837,179 | Benner et al. | Dec. 15, 1931 |
| 2,246,322 | Roth | June 17, 1941 |
| 2,397,352 | Hemminger | Mar. 26, 1946 |
| 2,536,099 | Schleicher | Jan. 2, 1951 |